United States Patent [19]
Miller, Jr. et al.

[11] Patent Number: 5,749,114
[45] Date of Patent: May 12, 1998

[54] POULTRY HOUSE CLEANER APPARATUS

[76] Inventors: A. Glenn Miller, Jr.; Martha C. Miller, both of 1041 Hwy 84 West, Thomasville, Ga. 31792

[21] Appl. No.: 678,830

[22] Filed: Jul. 12, 1996

[51] Int. Cl.$^6$ ........................................ A01K 31/04
[52] U.S. Cl. ........................ 15/93.1; 37/254; 172/445.1
[58] Field of Search ....................... 37/232, 233, 241, 37/253, 254, 264, 268; 172/445.1; 15/93.1, 93.3

[56] References Cited

U.S. PATENT DOCUMENTS

| | | | |
|---|---|---|---|
| 3,021,620 | 2/1962 | Rosenthal | 37/254 |
| 3,662,420 | 5/1972 | Jordan, Jr. | |
| 3,845,516 | 11/1974 | Abbott et al. | |
| 4,074,448 | 2/1978 | Niemela | 37/232 |
| 4,369,500 | 1/1983 | Miller | 37/241 |
| 4,667,426 | 5/1987 | Howard | 37/232 |

FOREIGN PATENT DOCUMENTS 534217   1/1977   U.S.S.R. ................ 15/93.1

Primary Examiner—David Scherbel
Assistant Examiner—Randall Chin
Attorney, Agent, or Firm—Carnes, Cona and Dixon

[57] ABSTRACT

The present invention provides a poultry house cleaner apparatus that is adapted to easily, quickly and efficiently clean, scrape and remove the manure of the chicken from the side walls of the chicken houses. This poultry house cleaner apparatus is adapted to be removably secured to a conventional tractor and comprises an angled blade having a sliding plate attached thereto. The sliding plate includes a somewhat L-shaped configuration for enabling one portion to be slideably mounted to the blade while a second portion extends outwardly and perpendicularly from the blade. This will provide for the sliding plate to scrape debris from any perpendicular surface. A transportation system is provided for enabling the debris to be transported from the sliding plate to an opposite side of the blade for relocating the debris to a more accessible location. Once relocated, this debris will be removed via any conventional removal methods, such as a conventional cleaning apparatus.

17 Claims, 3 Drawing Sheets

1

POULTRY HOUSE CLEANER APPARATUS

BACKGROUND OF THE INVENTION

1. Field of the Invention

The present invention relates generally to a poultry house cleaner apparatus and more particularly to a poultry house cleaner apparatus that is adapted to easily, quickly and efficiently clean, scrape and remove the manure of the chicken from the side wall of chicken houses.

2. Description of the Prior Art

Typically, a poultry house is generally a rectangular building comprised of an outer half wall with posts located every five feet to support the roof, ordinarily, especially in the southern states where below freezing temperatures are rare, the open portion of the outer wall is generally covered with a roll-down curtain that is used to protect the poultry from the weather. This configuration of a conventional poultry house is illustrated in FIG. 1. The floor of the building is earthen and is commonly covered with an organic material, such as wood chips, peanut hulls, or the like, to first protect the chickens from a cold and damp floor and later to act as an effective absorbent for the excess amount of chicken manure and moisture.

As grow-out of the poultry progresses, usually seven to eight weeks, droppings (manure) and other moisture accumulates and cakes on the floor and organic floor covering. This accumulation also occurs along the walls between the posts. This wall is illustrated in FIG. 1 and is labeled as reference numeral 16.

The manure is usually removed from the open area of the house with a conventional clean out machine or blade. However, an area of one to two feet from the walls is left because of the inaccessibility to the larger and more awkward clean out machines.

This particular area of caked manure must be cleaned and is usually accomplished by literally pulling the manure off the wall and placing it to a more accessible area for removal by the clean out machine. Normally, a worker will remove this manure by utilizing a device known as a manure rake or a similar tool. This process of scrapping and pulling on the manure is tedious and extremely time consuming, requiring up to four to six hours to clean each house. Not only is this method ineffective, but it can also be hazardous to the worker due to exposure of ammonia which the worker must endure.

A variety of devices have been designed to remove the caked material from the floor of the chicken house. Such a device is disclosed in U.S. Pat. No. 3,662,420 issued to Jordan, Jr. and U.S. Pat. No. 3,845,516 issued to Abbot et al. Both Jordan, Jr. and Abbot et al. disclose a scraper device which is removably secured to a tractor or the like.

These devices are designed especially for removal of waste on the floor of a chicken house and are silent to the use of a means of removing waste along the side wall of a conventional chicken house.

Accordingly, there exists a need to provide for an apparatus which will quickly, efficiently, and successfully clean the side wall of the chicken house. No previous efforts have been disclosed which provide the benefits intended with the present invention. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention provides a poultry house cleaner apparatus that is adapted to easily, quickly and efficiently clean, scrape and remove the manure of the chicken from the side walls of the chicken houses. This poultry house cleaner apparatus is adapted to be removably secured to a conventional tractor and comprises an angled blade having a transportation means and a sliding/adjusting plate. Once the angle blade is attached to the conventional tractor, the sliding plate will extend outwardly from the wheels of the tractor. This sliding plate is slideably mounted to the angle blade and includes a guide for enabling the sliding plate to travel easily along the side wall of a conventional chicken house for scraping and removing manure from the wall.

While traveling along the side wall, the sliding plate may come into contact with a post. Upon contact, the guide will shift and adjust the sliding plate in order to permit the sliding plate to travel along the post. After passing the post, the guide re-adjusts and re-shifts the sliding plate for enabling the sliding plate to contact and engage the side wall of the chicken house. To prevent damage to the wall of the chicken house and to the sliding plate, the guide includes a shock mechanism. The shock mechanism is attached to the angled blade and the sliding plate for eliminating the possibility of the sliding plate from colliding into the wall.

The angled blade includes opposite ends, wherein the sliding plate is attached to a first end and an opening is located at the second end. The transportation means extends from the first end to the opening located in proximity to the second end. As to be understood, utilization of the device occurs when the manure is removed from the wall area via the sliding plate. From the sliding plate, the manure is transported along the angled blade by way of the transportation means. The manure exits the angled blade through the opening located at the opposite end of the angled blade. Relocating the manure provides for the waste to be more accessible for removal by the conventional clean out machine.

Accordingly, it is the object of the present invention to provide for a poultry house cleaner apparatus which will overcome the deficiencies, drawbacks, and shortcomings of prior poultry house cleaner apparatus and method thereof.

Another object of the present invention is to provide for a poultry house cleaner apparatus which will safely, efficiently, and successfully clean and remove waste and debris which has accumulated along the side walls of a conventional chicken house.

Still another object of the present invention, to be specifically enumerated herein, is to provide a poultry house cleaner apparatus in accordance with the preceding objects and which will conform to conventional forms of manufacture, be of simple construction and easy to use so as to provide a device that would be economically feasible, long lasting and relatively trouble free in operation.

Although there have been many inventions related to a poultry house cleaner apparatus, none have been designed to clean and remove waste along the side wall of the chicken house. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENTS

Figure 1:
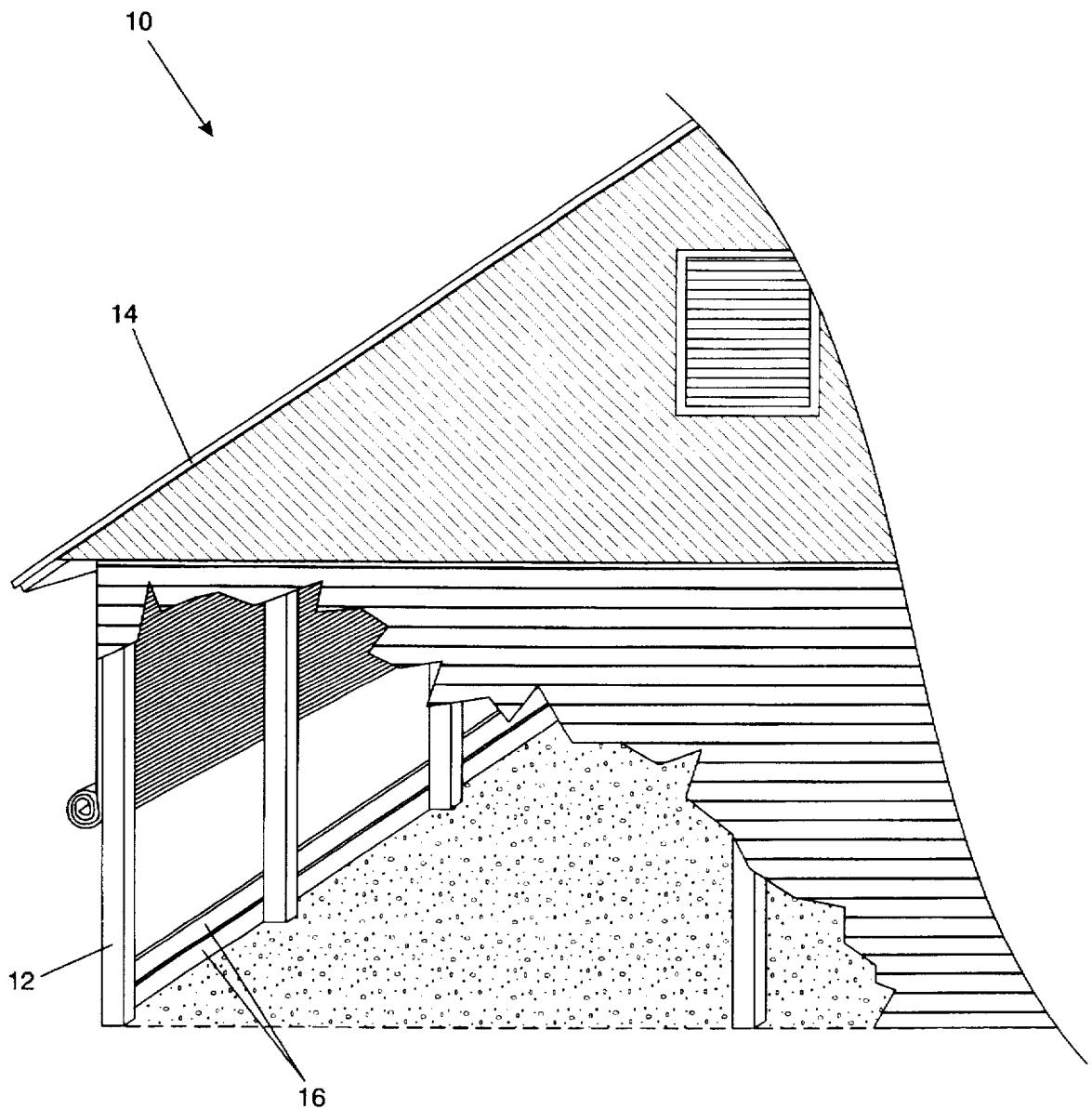
FIG. 1 is an elevational view of a conventional form of a chicken house.

As seen in FIG. 1, a conventional chicken house 10 includes a plurality of posts 12 which are used to support the roof 14 of a conventional chicken house 10. This will provide for the first and last posts to be situated approximately four inches from the outer perimeter of the roof 14. Extending across the posts 10, in a horizontal configuration, are a plurality of walls 16. As seen in the drawings, the posts 12 are substantially wider than the walls 16. As seen in the figure, when inside the conventional chicken house 10, the posts 12 extend outwardly from the walls 16. This design does provide adequate support for the roof but also provides an awkward method for cleaning and removing the debris which collects along the side walls 16 during a grow-out. The present invention is designed to eliminate this awkwardness and to enable easy and successful cleaning of the debris which has accumulated on the side walls 16.

Figure 2:
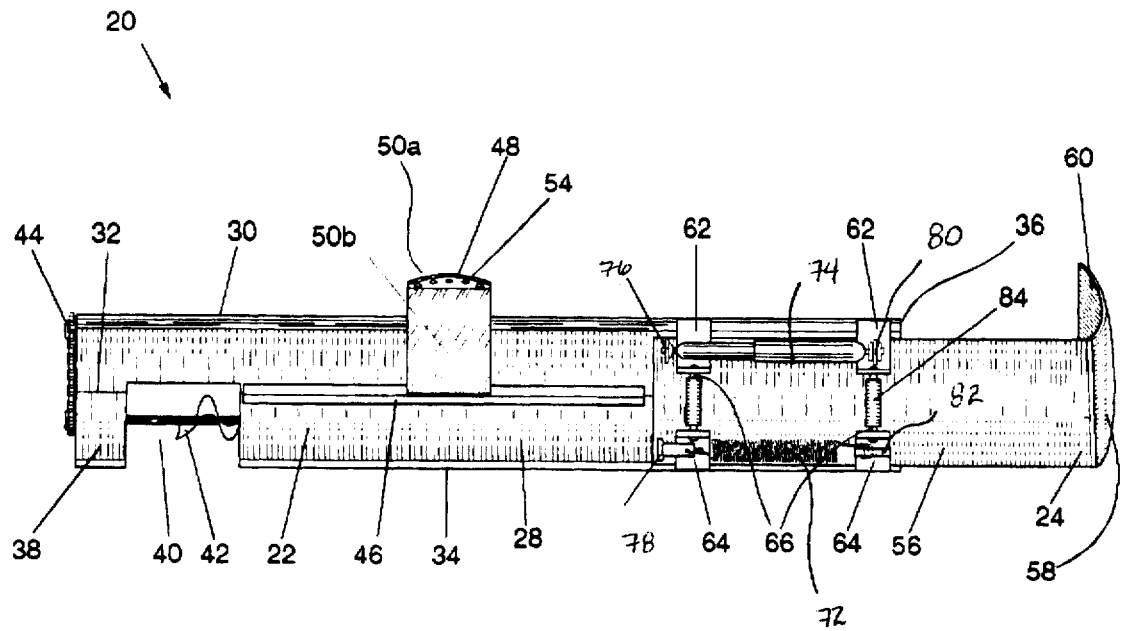
FIG. 2 is a back planar view of the poultry house cleaner apparatus of the present invention.
Figure 3:
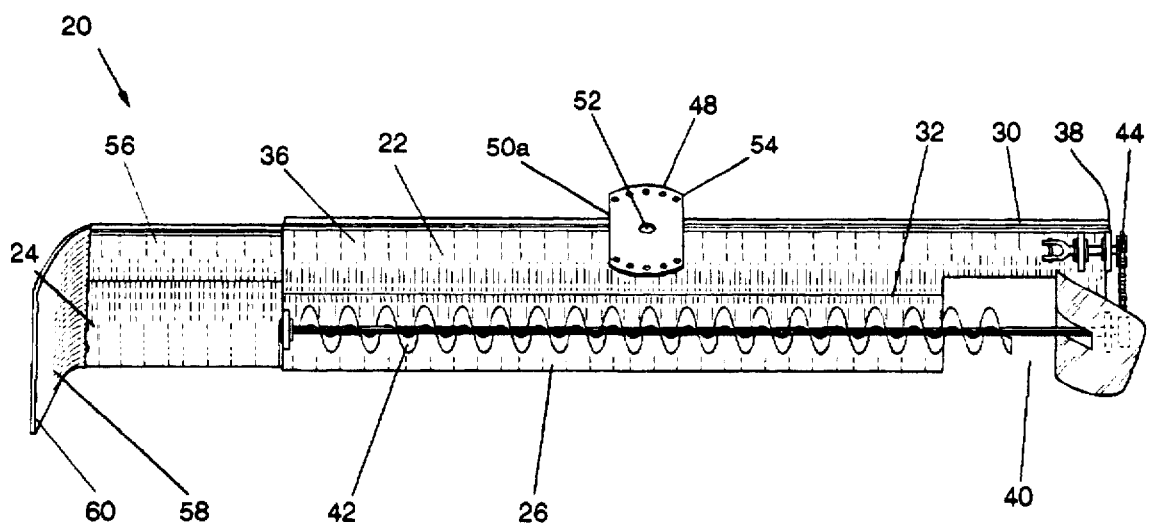
FIG. 3 is a front planar view of the poultry house cleaner apparatus of the present invention.
Figure 4:
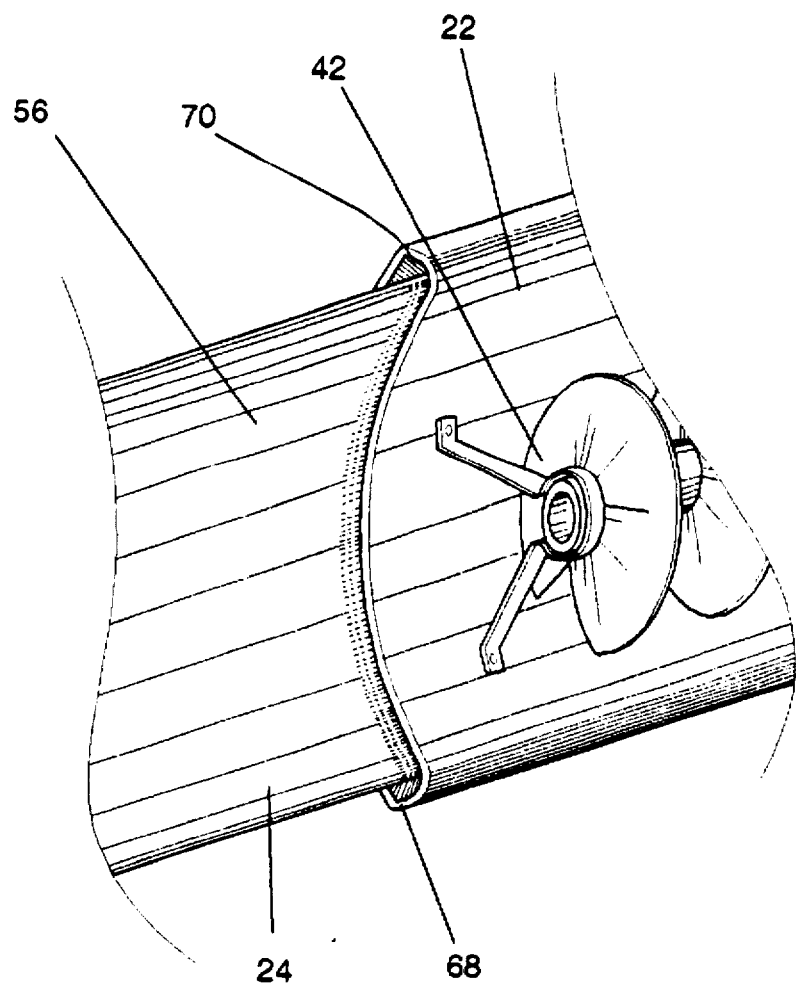
FIG. 4 is a detailed perspective view of the sliding plate slideably attached to the blade which is used in the poultry house cleaner apparatus of the present invention.

As seen in FIGS. 2–4, the poultry house cleaner apparatus 20 comprises a blade 22 having an outer sliding plate 24 attached thereto. This apparatus 20, in operation, will scrape, via the outer sliding plate 24, the debris off the side wall 16 of a conventional chicken house 10 and relocate it, via blade 22, to an area accessible to a conventional cleaning machine.

The blade 22 includes a front surface 26 (see FIG. 3) and a back surface 28 (see FIG. 2). The blade 22 is preferably angled so as to be designed and configured to contour slightly outward from the top 30 of the blade 22 to the center 32 of the blade 22 and to contour slightly inward from the center 32 of the blade 22 to the bottom 34 of the blade 22. This will provide for the blade to have a natural scope-like configuration which will inherently aid in the relocation of the manure from the side wall of a conventional chicken house to a location accessible to a conventional cleaning device. The curve configuration is best illustrated in FIG. 4.

The blade 22, as seen in FIGS. 2 and 3, further includes a first side 36 and a second side 38. The first side 36 and the second side 38 are divided by a swivel adjustment device 48. Slideably attached to the back surface 28 of the first side 36, via a slidable means, is the sliding plate 24 (FIGS. 2, 3 and 4). This outer sliding plate 24 extends beyond the conventional tractor once attached thereto. Located on the second side 38 of blade 22 is an opening or shoot 40 (FIGS. 2 and 3). Extending across the first side 36 and partially through the second side 38 is a transportation means (see reference numeral 42). This transportation means extends the entire length of the first side 36 and terminates at the opening or shoot 40. This is clearly illustrated in FIG. 3. Thereby, in operation, the debris will travel from the sliding plate 24 and exit the opening or shoot 40 located on the second side of the blade 22 by way of the transportation means. This transporting means is illustrated in further detail in FIG. 3.

As seen in FIG. 3, extending horizontally from the first side 36 to the opening 40 of the blade 22 is an auger system 42. This auger system 42 comprises an auger (blade circumferencially wrapped and encompassing a shaft illustrated—but not labeled) which is controlled via a gear drive system 44. The gear drive system 44 is powered by way of the conventional tractor. For added safety, the gear drive system can be maintained within a protective housing (not illustrated), which may be designed to be removably secured to the gear drive system. Accordingly, it is seen that the auger system (auger and gear drive system) constitutes the transportation means.

This auger system 42 is designed and configured to enable the debris, which was removed and collected via the sliding plate 24, to travel from the first side 36 of the blade 22 to the opening or shoot 40. As the sliding plate is scraping the debris from the side wall, the auger system is in operation. While operating the auger will constantly be rotating. During rotation, the auger is capable of transporting the debris and provide for the debris to travel from one end of the blade to the opening or shoot located on the second side 38 of the blade. The auger terminates at the opening or shoot 40. Upon reaching the opening or shoot 40, the debris is able to exit the blade 22 in order to be more accessible to workmen or accessible for collection with a conventional cleaning apparatus.

As seen in FIG. 2, a support 46 is centrally secured to the back surface 26 of blade 22. Centrally located and extending outwardly from the support 46 is a swivel adjustment device 48. As seen, in FIGS. 2 and 3, the adjusting device 48 is secured to the support 46. This adjusting device 48 has an inverted L-shape, hence providing for a top portion 50a and a lower portion 50b. The lower portion 50b extends upwardly from the support 46 and is secured thereto. The top portion 50a is secured to the lower portion 50b and extends outwardly and perpendicularly from the lower portion. Accordingly, providing the inverted L-shape of the adjusting device 48 with respect to the support 46.

As seen, the swivel adjustment device 48 includes a central hole 52 and a plurality of arcuately displaced holes 54. The central hole 52 enables attachment to the conventional three point hitch while the arcuately displaced holes 54 enables angular displacement of the blade 22. A bolt is adapted to be removably secured to the central hole. A pin or the like is adapted to be removably secured to a hole from the plurality of arcuately displaced holes. This hole from the plurality of arcuately displaced holes is adapted to align with a second hole located in the conventional hitch. This will provide for the pin to be removably secured to the h oles. Each hole of the set of arcuately displace d holes represents a different angle. The design and configuration provide s t he u ser with a means for adjusting the angular displacement of the blade 22.

The outer sliding plate 24 is used to scrape the manure and debris from the side wall of the chicken house once the, blade 22 is secured to a conventional tractor device. This sliding plate 22 is illustrated in further detail in FIGS. 2–4. The sliding plate 24 is located on the back surface of the first side 36 of the blade. This sliding plate 24 is designed to slide horizontally with respect to the blade 22 via a sliding means. Additionally, it is this sliding plate 24 which will scrape and clean debris and the like from the side walls of a conventional chicken house (see FIG. 1). To aid in the removal of the debris from the wall, the outer edge 84 of the first portion 56 may be curved slightly inward. This curved tip will also prevent damage to the supports of the conventional chicken house.

For added proficiency, and as illustrated in FIGS. 2 and 3, the sliding plate can have an L-shape configuration to provide for a second portion 58 to be perpendicularly secured to the first portion 56. This second portion 58 extends perpendicularly from the outer edge 84 of the first portion. This design will provide for the second portion 58 of the sliding plate 24 to extend outwardly and perpendicularly from blade 22. Upon attachment of the blade 22 to a conventional tractor, the second portion 58 will be situated beyond the tractor's wheels. This will allow for easy accessibility of the second portion 58 to the wall. This second portion 58 acts as a scraper to enable the debris to be easily removed from the wall.

To aid in the removal of the debris from the wall, the tip 60 of the second portion 58 may be curved slightly inward, as illustrated in FIGS. 2 and 3. This tip 60 will also prevent damage to the supports of the conventional chicken house.

The first portion 56 of the sliding plate 24 is slideably mounted to the first side of the blade, via a sliding means. The sliding means includes brackets 62 and 64, shafts 66, buffer 74 and spring 72. To enable a slidable attachment, the device is provided with a first set of U-shaped brackets 62 and a second set of Ushaped brackets 64 (illustrated in FIGS. 2 and 3). The first set of brackets are situated on the upper edge of the blade and plate. The second set of brackets are situated on the lower edge of the blade and plate. The first set of brackets 62 and the second set of brackets 64 are permanently secured to the blade 22. The design and configurations of the brackets will provide for the open end of the first set of brackets to encompass the upper edge of the blade and plate while the open end of the second set of brackets to encompass the lower edge of the blade and plate. The first set of brackets and the second set of brackets inherently form open grooves having the open ends to face each other. Shafts 66 are used to connect the first set of brackets with the second set of brackets. Thereby, as seen in FIGS. 2 and 3, the combination of the brackets and shafts will wrap around the back surface and top edge of the plate 24. This will enable the plate 24 to slide within the opened area or grooves of the brackets. These brackets are located in proximity to the first end of blade 22.

The brackets can be eliminated by alternating the blade 22. This alteration is illustrated in FIG. 4. As seen, the top edge of the blade and the lower edge of the blade can be curved to have a U-shape configuration at edges 68 and 70, respectively. This will provide for slide plate 24 to slide within the blade 22 via the U-shaped edges 68 and 70.

A spring 72 and a conventional buffer shock 74 are horizontally secured to the slider plate 24 and to the blade 22. As seen in FIG. 2, the attachment of the spring 72 to the slider plate 24 occurs at attachment point 78 while the attachment of shock 74 to the slider plate occurs at attachment point 76. The attachment of the spring 72 to the blade 22 occurs at attachment point 82 while the attachment of shock 74 to the blade 22 occurs at attachment point 80. The various attachment points can occur any along the blade 22 or plate 24. Additionally, the attachment can be any conventional attaching means. For providing for an aesthetically pleasing product, the spring and shock can be attached to one bracket, as illustrated, for enabling the devices to be attached to the blade, while the second attachment point can occur in proximity to the opposite bracket, for enabling the devices to be attached to the sliding plate.

The spring 72 enables the plate to adjust to the wall while the buffer shock 74 allows the plate to return to the wall after coming into contact with an obstacle, such as the support or the like. The spring will compress once contact is made between the slider plate and an obstacle. The use of the buffer shock and the spring constitutes a guide for guiding the slider plate along the wall.

To provide for a smooth transition and movement of the sliding plate 24, roller bearings 84 can be provided. These roller bearings are located on the shafts, between the blade 22 and the scraper 24. Optionally, the roller bearings may be located between the blade 22 and the sliding plate 24.

Utilization of the device occurs when a user attaches the blade 22 to a conventional three-point hitch. This attachment can occur at a desired angle by using the adjustment device. Once the desired angle is obtained, the user attaches the blade to the conventional tractor via a three point hitch.

Once attached, the second portion 58 will extend outwardly and beyond the wheels of the conventional tractor, while the second portion of the blade will be situated perpendicularly with respect to the blade 22. This design will enable the scraper to contact and engage the debris which has accumulated on the side wall of the conventional chicken house.

The auger 42 rotates continuously by way of the gear system 44 to enable the debris from the second portion of the slide plate to be transferred from the first side of the blade to the second side of the blade. This debris exits the blade 22 via the opening 40. The relocated debris is accessible for easy-removal by a conventional cleaning apparatus or the like.

While the invention has been particularly shown and described with reference to an embodiment thereof, it will be understood by those skilled in the art that various changes in form and detail may be made without departing from the spirit and scope of the invention.

We claim:

1. A cleaner device adapted to be removably secured to a conventional tractor and for use with a conventional chicken house for removing debris from a wall of the conventional chicken house, said cleaner device comprising:

an attachment means for enabling attachment to a conventional tractor;

a blade having a first side and a second side;

said blade being secured to said attachment means;

a sliding plate;

a sliding means being secured to said blade and said sliding plate;

said sliding plate being slideably attached to said first side of said blade via said sliding means;

a scraping means being located on said sliding plate;

said scraping means scrapes and removes debris from a wall of a conventional chicken house; and a transportation means extends from said first side of said blade to said second side of said blade for enabling the debris to be transported from said sliding plate to said blade and to said second side for removal.

2. A cleaner device as in claim 1 wherein said blade being curved and having a top, a center, a bottom, a front surface, and a back surface, from said front surface and from said center to said top, said blade contours upward and outward, from said front surface and from said center to said bottom, said blade contours downward and outward.

3. A cleaner device as in claim 1 wherein said transportation means includes an auger and a gear drive system, said auger extends horizontally across said blade from said first side to said second side, said auger being controlled via said gear system.

4. A cleaner device as in claim 1 wherein said attachment means further include a swivel adjustment for enabling angular adjustment of said blade.

5. A cleaner device as in claim 1 wherein a guide means being secured to said blade and said sliding plate for enabling said sliding plate to shift and adjust to the various contours of said wall.

6. A cleaner device as in claim 5 wherein said guide means includes a shock and a spring.

7. A cleaner device as in claim 5 wherein said guide means includes a shock having a first end and a second end, and a spring having a first end and a second end, said first end of said shock being secured to said sliding plate and said second end of said shock being secured to said blade, and said first end of said spring being secured to said sliding plate and said second end of said spring being secured to said blade.

8. A cleaner device as in claim 1 wherein said sliding plate includes a first portion and a second portion, said first portion and said second portion form a L-shape, said first portion being slideably mounted to said first side on said back surface of said blade, said first portion includes an outer edge, said second portion being perpendicularly attached to said first portion at said outer edge, said second portion extends beyond a conventional tractor once said blade is secured thereto, said second portion will contact said wall for removing said debris and said second portion constitutes said scraping means.

9. A cleaner device as in claim 8 wherein said second portion includes a tip, said tip being curved and said tip constitutes said scraping means.

10. A cleaner device as in claim 8 wherein said second portion being curved.

11. A cleaner device as in claim 1 wherein said sliding means includes a first set of brackets and a second set of brackets, said blade includes an upper edge and a lower edge, said first set of brackets are secured to said upper edge of said blade, said second set of brackets are secured to said lower edge of said blade, said first set of brackets and said second set of brackets are U-shaped, said first set of brackets and said set of brackets each include an open end, said open ends of said first set of brackets face said open ends of said second set of brackets, said sliding plate being received in said opened ends of said first set of brackets and said open ends of said second set of brackets.

12. A cleaner device as in claim 11 wherein shafts connect said first set of brackets to said second set of brackets.

13. A cleaner device as in claim 12 wherein rollers are secured to each shaft.

14. A cleaner device as in claim 1 wherein said sliding means includes a first groove and a second groove, said blade includes a top edge and a lower edge, said top edge being curved downward to form said first groove, said lower edge being curved upward to form said second groove, and said sliding plate being received in said first groove and said second groove.

15. A cleaner device as in claim 1 wherein said sliding plate includes an outer edge, said outer edge being curved, and said outer edge constitutes said scraping means.

16. A cleaner device as in claim 1 wherein an opening is located in said second side of said blade, and said opening receives said debris from said transportation means for rending said debris to exit via said opening.

17. A cleaner device as in claim 16 wherein an opening being located in said second side of said blade, said transportation means includes an auger and a gear drive system, said auger extends horizontally across said blade from said first side to said opening, said auger being controlled via said gear drive system.

* * * * *